US010938632B2

(12) United States Patent
Huang et al.

(10) Patent No.: US 10,938,632 B2
(45) Date of Patent: *Mar. 2, 2021

(54) QUERY FAILURE DIAGNOSIS IN SOFTWARE-DEFINED NETWORKING (SDN) ENVIRONMENTS (71) Applicant: VMware, Inc., Palo Alto, CA (US)

(72) Inventors: Qiao Huang, Beijing (CN); Donghai Han, Beijing (CN); Qiong Wang, Beijing (CN); Benli Ye, Beijing (CN); Xu Wang, Beijing (CN); Jia Cheng, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/278,198

(22) Filed: Feb. 18, 2019

(65) Prior Publication Data
US 2020/0213184 A1 Jul. 2, 2020

(30) Foreign Application Priority Data
Dec. 28, 2018 (WO) .............. PCT/CN2018/124709

(51) Int. Cl.
*H04L 12/24* (2006.01)
*H04L 12/26* (2006.01)
*H04L 29/12* (2006.01)

(52) U.S. Cl.
CPC .......... *H04L 41/0677* (2013.01); *H04L 41/14* (2013.01); *H04L 43/10* (2013.01); *H04L 43/0811* (2013.01); *H04L 61/1511* (2013.01)

(58) Field of Classification Search
CPC ..... H04L 41/0677; H04L 41/14; H04L 43/10; H04L 43/0811; H04L 61/1511;
(Continued)

(56) References Cited

U.S. PATENT DOCUMENTS 7,366,790 B1 * 4/2008 Rustad ................ H04L 43/0858
370/229
7,706,278 B2 * 4/2010 Wing .................... H04L 43/026
370/236
(Continued)

FOREIGN PATENT DOCUMENTS

WO    WO-2015119611 A2 *  8/2015  ......... H04L 12/6418

*Primary Examiner* — Ninos Donabed
(74) *Attorney, Agent, or Firm* — SU IP Consulting (57) ABSTRACT Example methods are provided for a network management entity to perform query failure diagnosis in a software-defined networking (SDN) environment. The method may comprise receiving a request to diagnose a query failure; and generating and sending control information to a host to cause the host to inject, at a first network element, a diagnostic packet for transmission along a datapath to a query failure via multiple second network elements. The diagnostic packet may be a query configured according to a query protocol supported by the query server. The method may also comprise: receiving report information associated with the diagnostic packet from at least one of the following: the first network element, the multiple second network elements and the query failure; and based on the report information, determining a diagnosis result associated with the query failure.

21 Claims, 9 Drawing Sheets (58) Field of Classification Search
CPC ......... H04L 45/64; H04L 41/12; H04L 45/70;
H04L 43/0829; H04L 41/24; H04L 45/26;
H04L 47/20; H04L 49/25; H04L 43/06;
H04L 45/306; H04L 45/38; H04L 45/42
See application file for complete search history.

(56) References Cited

U.S. PATENT DOCUMENTS

| | | | | |
|---|---|---|---|---|
| 8,135,828 | B2* | 3/2012 | Agarwal | H04L 41/0631 709/224 |
| 8,407,169 | B2* | 3/2013 | Hofford | G06N 5/025 706/45 |
| 9,787,559 | B1* | 10/2017 | Schroeder | H04L 41/5038 |
| 10,129,127 | B2* | 11/2018 | Lin | H04L 43/10 |
| 2006/0133387 | A1* | 6/2006 | Pekhteryev | H04L 43/10 370/400 |
| 2009/0019536 | A1 | 1/2009 | Green et al. | |
| 2009/0161554 | A1* | 6/2009 | Agarwal | H04L 43/0852 370/241 |
| 2009/0327811 | A1* | 12/2009 | Hofford | G06N 5/025 714/26 |
| 2010/0168914 | A1* | 7/2010 | Kang | B25J 9/1602 700/248 |
| 2011/0202793 | A1* | 8/2011 | Xu | H04L 29/12066 714/15 |
| 2015/0237003 | A1* | 8/2015 | Ghai | H04L 61/2015 709/220 |
| 2015/0281036 | A1* | 10/2015 | Sun | H04L 41/14 370/248 |
| 2015/0304158 | A1 | 10/2015 | Dharmadhikari et al. | |
| 2015/0308627 | A1* | 10/2015 | Hoskins | F17D 5/02 702/45 |
| 2016/0034270 | A1* | 2/2016 | Swierc | G06F 11/3668 717/126 |
| 2016/0285750 | A1 | 9/2016 | Saquib et al. | |
| 2016/0294734 | A1 | 10/2016 | Jang et al. | |
| 2016/0315821 | A1* | 10/2016 | Page | H04L 41/12 |
| 2017/0249434 | A1* | 8/2017 | Brunner | G06F 16/3334 |
| 2017/0264557 | A1 | 9/2017 | John et al. | |
| 2017/0302470 | A1 | 10/2017 | Clark et al. | |
| 2017/0310535 | A1* | 10/2017 | Siegel | H04L 43/0817 |
| 2017/0331672 | A1 | 11/2017 | Fedyk et al. | |
| 2018/0060148 | A1* | 3/2018 | Rudy | G11C 29/38 |
| 2018/0115469 | A1* | 4/2018 | Erickson | H04L 43/062 |
| 2018/0191471 | A1 | 7/2018 | Elhaddad et al. | |
| 2018/0204135 | A1* | 7/2018 | Narasimha | G06F 16/35 |
| 2018/0227209 | A1* | 8/2018 | Lin | H04L 45/38 |
| 2018/0302439 | A1 | 10/2018 | Hoffmann | |
| 2020/0213214 | A1 | 7/2020 | Huang et al. | |

* cited by examiner

QUERY FAILURE DIAGNOSIS IN SOFTWARE-DEFINED NETWORKING (SDN) ENVIRONMENTS

CROSS-REFERENCE TO RELATED APPLICATION

The present application claims the benefit of Patent Cooperation Treaty (PCT) Application No. PCT/CN2018/124709, filed Dec. 28, 2018. The present application is related in subject matter to U.S. patent application Ser. No. 16/278,194, which is incorporated herein by reference.

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, various network failures that adversely affect the performance of hosts and VMs may occur in the SDN environment. However, it may be challenging to perform network diagnosis using existing tools.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and so on are used to describe various elements, these elements should not be limited by these terms. These terms are used to distinguish one element from another. A first element may be referred to as a second element, and vice versa.

Challenges relating to network diagnosis will now be explained in more detail using FIG. 1, which is a schematic diagram illustrating example Software-Defined Networking (SDN) environment 100 in which network diagnosis may be performed. It should be understood that, depending on the desired implementation, SDN environment 100 may include additional and/or alternative components than that shown in FIG. 1. SDN environment 100 includes multiple hosts, such as host-A 110A, host-B 110B and host-C 110C that are inter-connected via physical network 104. In practice, SDN environment 100 may include any number of hosts (also known as a "host computers", "host devices", "physical servers", "server systems", "transport nodes," etc.), where each host may be supporting tens or hundreds of VMs.

Each host 110A/110B/110C may include suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM4 134; host-B 110B supports VMs 132-133; and host-C 110C supports VMs 135-136. Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). For example, the virtual resources may include virtual CPU, guest physical memory, virtual disk, virtual network interface controller (VNIC), etc. Hardware resources may be emulated using virtual machine monitors (VMMs). For example in FIG. 1, VNICs 141-146 are emulated by corresponding VMMs (not shown for simplicity). The VMMs may be considered as part of respective VMs 131-136, or alternatively, separated from VMs 131-136. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs 131-136. In SDN environment 100, logical switches and logical DRs may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical port. For example, logical ports 151-156 are associated with respective VMs 131-136. Here, the term "logical port" may refer generally to a port on a logical switch to which a virtualized computing instance is connected. A "logical switch" may refer generally to a software-defined networking (SDN) construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

To protect VMs 131-136 against security threats caused by unwanted packets, hypervisors 114A-C may implement firewall engines to filter packets. For example, distributed firewall engines 161-166 (labelled "DFW1" to "DFW6") are configured to filter packets to, and from, respective VMs 131-136 according to firewall rules. In practice, network packets may be filtered according to firewall rules at any point along a datapath from a VM to corresponding physical NIC 124A/124B/124C. In one embodiment, a filter component (not shown) is incorporated into each VNIC 141-146 that enforces firewall rules that are associated with the endpoint corresponding to that VNIC and maintained by respective distributed firewall engines 161-166.

Through virtualization of networking services in SDN environment 100, logical overlay networks may be provisioned, changed, stored, deleted and restored programmatically without having to reconfigure the underlying physical hardware architecture. A logical overlay network (also known as "logical network") may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1, VM1 131 on host-A 110A and VM2 132 on host-B 110B may be connected to the same logical switch and located on the same logical layer-2 segment, such as a segment with VXLAN network identifier (VNI)=6000.

SDN manager 170 and SDN controller 174 are example network management entities in SDN environment 100. To send and receive the control information (e.g., configuration information), each host 110A/110B/110C may implement local control plane (LCP) agent (not shown for simplicity) to interact with SDN controller 174. For example, control-plane channel 101/102/103 may be established between SDN controller 174 and host 110A/110B/110C using TCP over Secure Sockets Layer (SSL), etc. Management entity 170/174 may be implemented using physical machine(s), virtual machine(s), a combination thereof, etc.

Each host 110A/110B/110C also maintains data-plane connectivity with other host(s) via physical network 104 to facilitate communication among VMs located on the same logical overlay network. Hypervisor 114A/114B/114C may implement a virtual tunnel endpoint (VTEP) to encapsulate and decapsulate packets with an outer header (also known as a tunnel header) identifying the relevant logical overlay network (e.g., VNI=6000). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B) and hypervisor-C 114C implements a third VTEP with (IP-C, MAC-C, VTEP-C). Encapsulated packets may be sent via an end-to-end, bi-directional communication path (known as a tunnel) between a pair of VTEPs over physical network 104.

In practice, the performance of hosts 110A-C may be adversely affected by various network failures or issues in SDN environment 100. In this case, users (e.g., network administrators) usually have to identify the source(s) or origin(s) of these failures for network troubleshooting and debugging purposes. As SDN environment 100 increases in scale and complexity, troubleshooting becomes more challenging, which results in system downtime and performance issues. As such, more advanced tools are required to improve network diagnosis. In the following, various examples relating to (A) network configuration failure diagnosis will be discussed using FIGS. 2-5, and (B) query failure diagnosis using FIGS. 6-9.

(A) Network Configuration Failure Diagnosis

According to a first aspect of the present disclosure, diagnosis of network configuration failures may be improved in SDN environment 100 using diagnostic packets that are specifically configured according to a network configuration protocol supported by a configuration server. For example in FIG. 1, an example application-layer network configuration protocol is dynamic host configuration protocol (DHCP) supported by DHCP server 135. In practice, DHCP server 135 may be deployed to assign network configuration parameters to VMs 131-134, such as IP address, etc. DHCP server 135 may be implemented by an edge node or logical service router (SR), which represents a centralized routing component that is deployed to provide centralized stateful services, such as DHCP services, load balancing, network address translation (NAT), etc.

Figure 2:
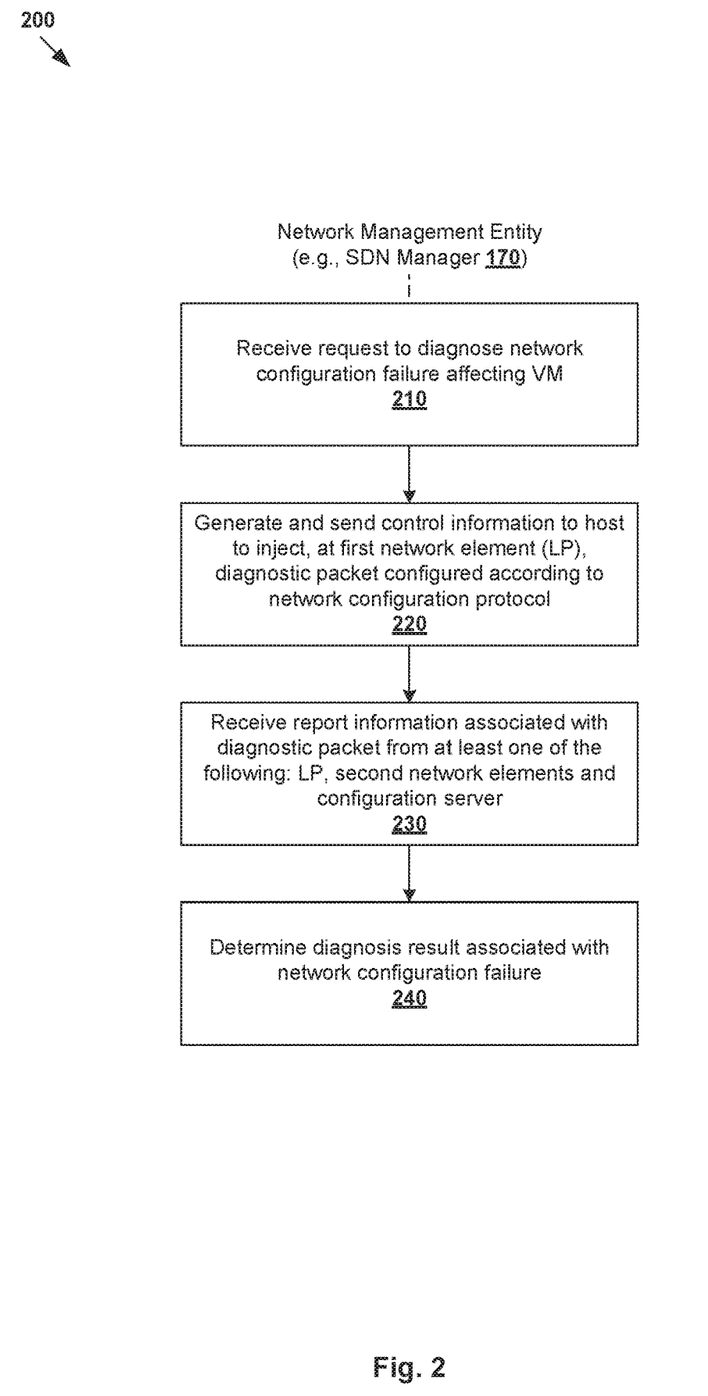
FIG. 2 is a flowchart of an example process for a network management entity to perform network configuration failure diagnosis in an SDN environment.

In more detail, FIG. 2 is a flowchart of example process 200 for a network management entity to perform network configuration failure diagnosis in SDN environment 100. Example process 200 may include one or more operations, functions, or actions illustrated by one or more blocks, such as 210 to 240. The various blocks may be combined into fewer blocks, divided into additional blocks, and/or eliminated depending on the desired implementation. In practice, example process 200 may be implemented by any suitable network management entity, such as SDN manager 170 using network diagnosis module 172, SDN controller 174 using CCP module 176, etc. In the following, various examples will be discussed using VM 131/132/133/134 as an example "virtualized computing instance," host 110A/110B as an example "host," and DHCP server 135 as an example "configuration server."

At 210 in FIG. 2, SDN manager 170 receives a request to diagnose a network configuration failure affecting VM1 131 that is connected with a first network element (e.g., LP1 151) and supported by host-A 110A. At 220 in FIG. 2, SDN manager 170 generates and sends control information (see 180 in FIG. 1) to host-A 110A to cause host-A 110A to inject, at LP1 151, a diagnostic packet (see 181 in FIG. 1) for transmission along a datapath to DHCP server 135 via multiple second network elements (see examples in FIG. 4 and FIG. 5).

Figure 1:
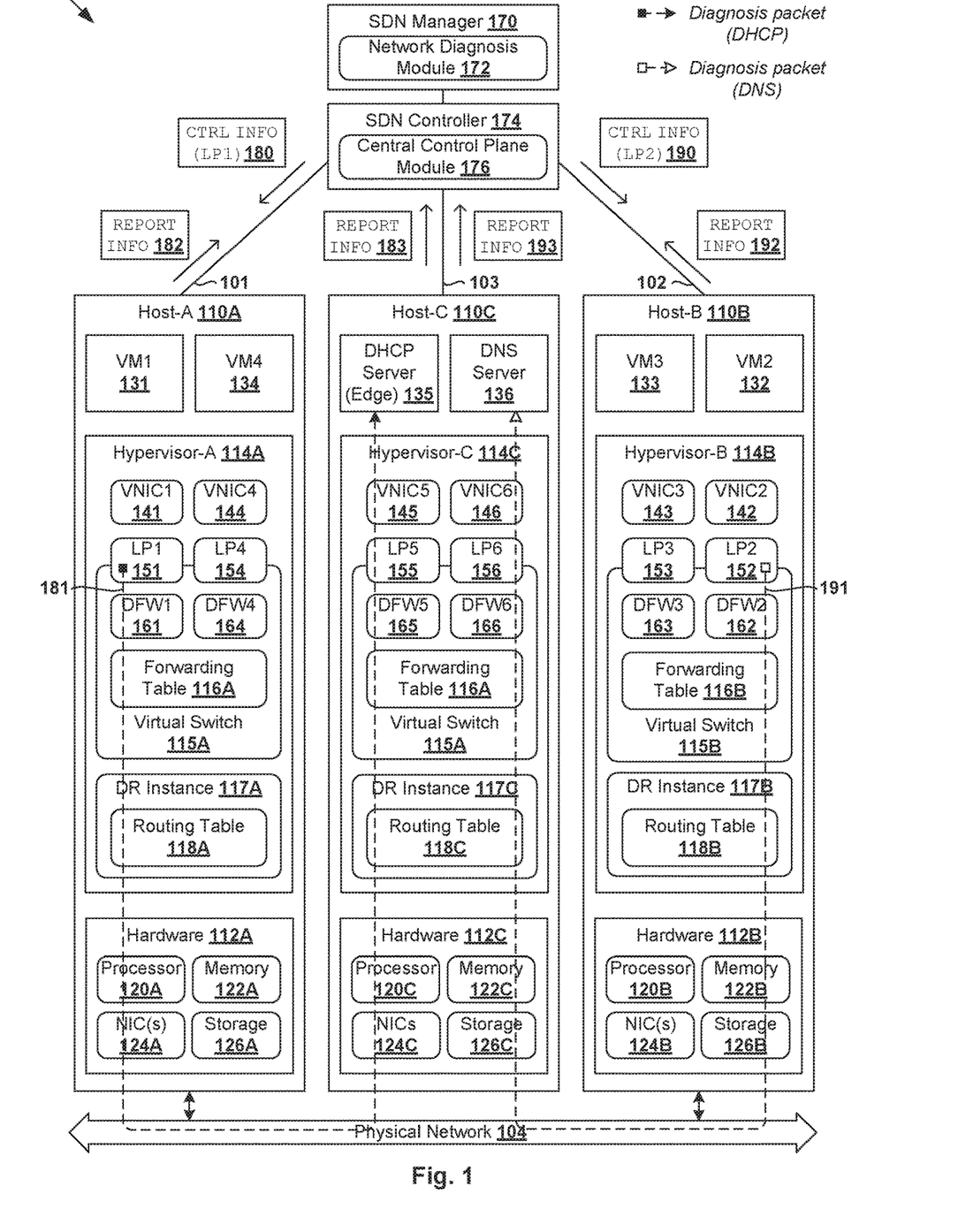
FIG. 1 is a schematic diagram illustrating an example Software-Defined Networking (SDN) environment in which network diagnosis may be performed.

In the example in FIG. 1, diagnostic packet 181 may be configured according to network configuration protocol=DHCP supported by DHCP server 135, such as a DHCP discover packet, DHCP request packet, etc. Diagnostic packet 181 may be configured to include a flag to cause LP1 151, the second network elements and DHCP server 135 to generate and send report information associated with diagnostic packet 181 to SDN manager 170. As used herein, the term "network element" may refer generally to a logical entity that is deployed in a logical network, such as a logical port, logical switch, logical router port, logical router, distributed firewall engine, VNIC, etc. Alternatively or additionally, a "network element" may also be a physical entity, such as a physical NIC, etc. Each network element along the datapath may be considered as a checkpoint capable of generating and sending report information to SDN manager 170.

At 230 in FIG. 2, SDN manager 170 receives report information (see 182-183 in FIG. 1) associated with diagnostic packet 181 from at least one of the following: LP1 151, any second network element, and DHCP server 135. At 240 in FIG. 2, based on report information 182-183, SDN manager 170 determines a diagnosis result associated with the network configuration failure.

Using examples of the present disclosure, network configuration failures may be diagnosed more quickly to reduce any performance impact on VMs 131-134 and hosts 110A-C. Any suitable "network configuration failure" may be diagnosed. In one example, based on report information 182-183 indicating that diagnostic packet 181 is dropped at a particular second network element, SDN manager 170 may determine that the network configuration failure (e.g., IP address assignment failure) is caused by unreachability of DHCP server 135 from LP1 151. In another example, based on report information 182-183 indicating that diagnostic packet 181 is delivered to DHCP server 135 but an error (e.g., IP address conflict) detected by DHCP server 135, determining that the network configuration failure is caused by the error. By finding possible root causes using diagnostic DHCP packets, network configuration failures may be resolved more quickly, either manually by the users or programmatically.

Example Diagnostic DHCP Packets

Figure 3:
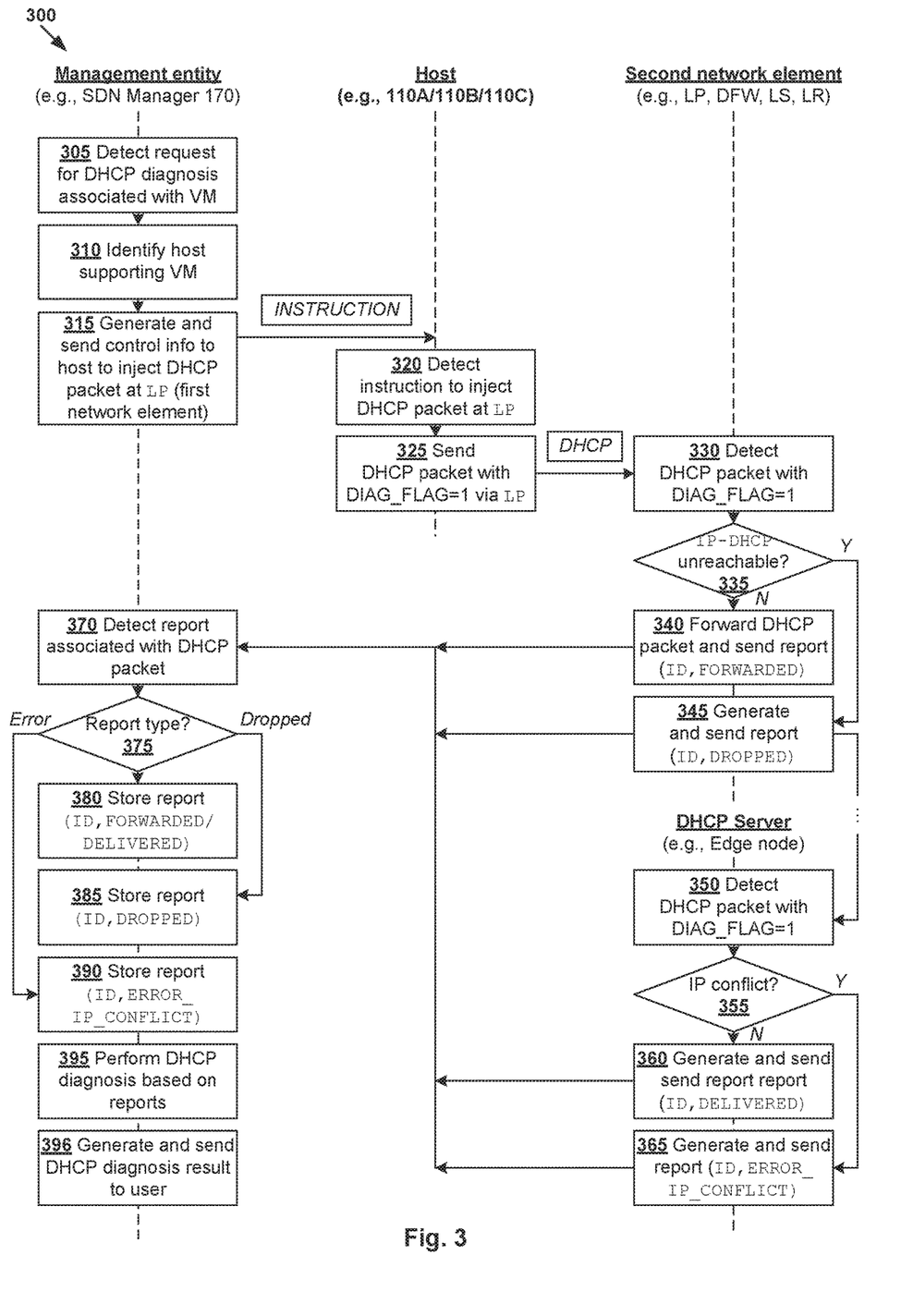
FIG. 3 is a flowchart of an example detailed process of network configuration failure diagnosis in an SDN environment.

FIG. 3 is a flowchart of example detailed process 300 for network configuration failure diagnosis in SDN environment 100. Example process 300 may include one or more operations, functions, or actions illustrated at 305 to 396. The various operations, functions or actions may be combined into fewer blocks, divided into additional blocks, and/or eliminated depending on the desired implementation. Example process 300 may be implemented by any suitable management entity (e.g., SDN manager 170 and/or SDN controller 174) and host 110A/110B/110C (e.g., network elements implemented by hypervisor 114A/114B/114C), etc. The example in FIG. 3 will be explained using FIG. 4, which is a schematic diagram illustrating example network configuration failure diagnosis 400 for traffic to a configuration server in SDN environment 100.

(a) Diagnostic DHCP Packets to DHCP Server

At 305 in FIG. 3, SDN manager 170 receives a user's diagnosis request (see 410 in FIG. 4) to diagnose a network configuration failure affecting VM1 131. In practice, request 410 may be received from user device 409 (e.g., operated by a network administrator) via any suitable interface supported by SDN manager 170, such as graphical user interface (GUI), command-line interface (CLI), application programming interface (API) calls, etc.

In one example, the network configuration failure might be the failure of VM1 131 to acquire an IP address from DHCP server 135. In another example, the network configuration failure might be a (suspected) IP address conflict. In practice, an IP address conflict might occur in various scenarios. One scenario is a network administrator assigning VM1 131 with a static IP address=IP-1 without knowing that DHCP server 135 has dynamically assigned the same IP address to another system. Another scenario is a malfunction at DHCP server 135 might cause the same dynamic IP address to be allocated to multiple systems simultaneously. Besides IP address, other network configuration parameter(s) may be considered, such as subnet mask, DNS IP address, gateway IP address, IP lease time, DHCP server identifier, etc.

At 310 in FIG. 3, in response to receiving diagnosis request 410, SDN manager 170 identifies host-A 110A supporting VM1 131. Depending on the desired implementation, block 310 may involve SDN manager 170 generating and sending a query to SDN controller 174 on the CCP. In response, SDN controller 174 may send SDN manager 170 information identifying host-A 110A supporting VM1 131.

At 315 in FIG. 3, SDN manager 170 generates and sends control information (see 420 in FIG. 4) to host-A 110A to instruct host-A 110A to inject, at logical port=LP1 151 associated with VM1 131, a diagnostic DHCP packet that is destined for DHCP server 135. At 320 and 325, in response to receiving the control information, host-A 110A injects the diagnostic DHCP packet (see "DHCP1" 430 in FIG. 4) at logical port=LP1 151 for transmission to DHCP server 135.

Figure 4:
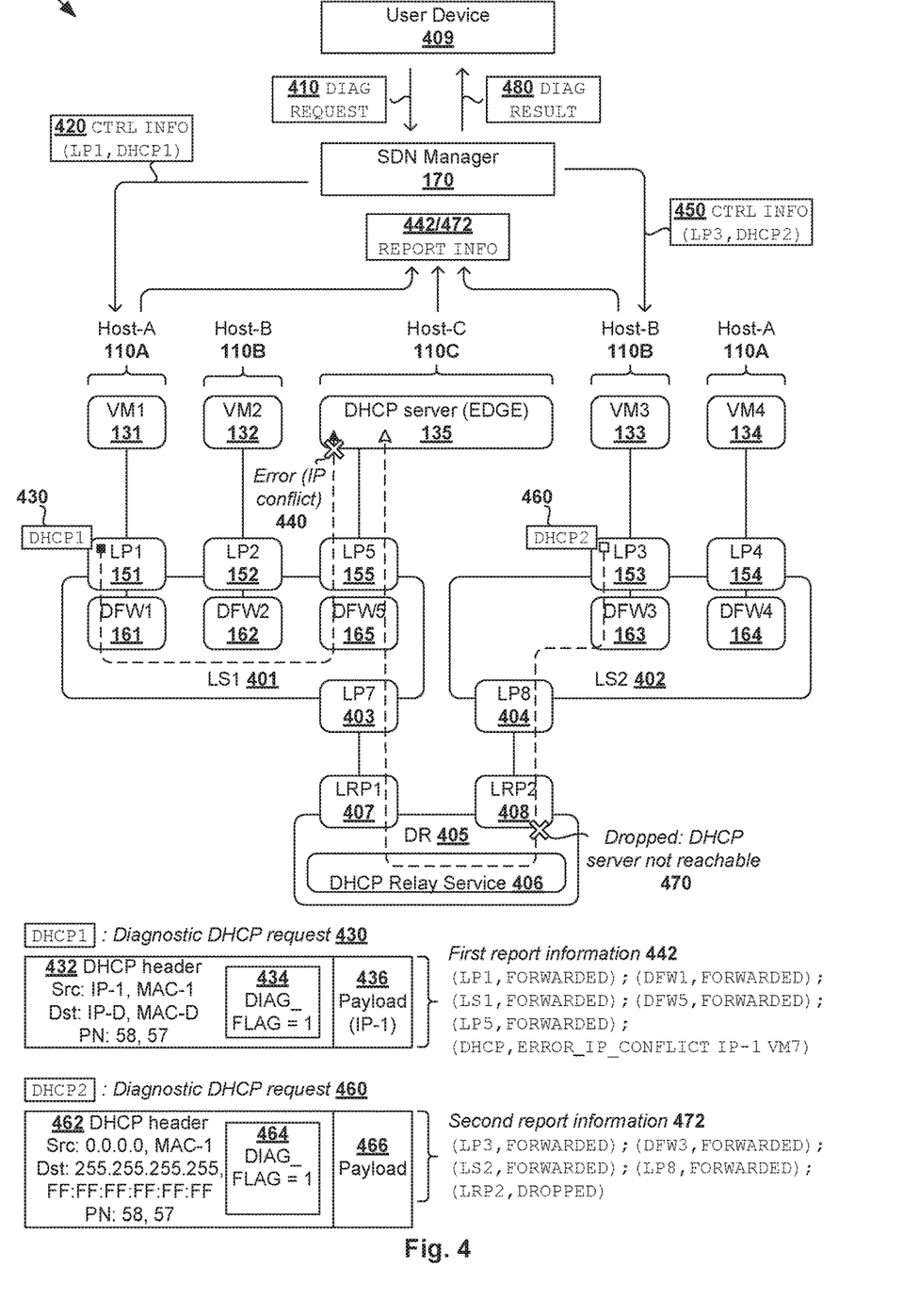
FIG. 4 is a schematic diagram illustrating an example network configuration failure diagnosis for traffic to a configuration server in an SDN environment.

In the example in FIG. 4, diagnostic DHCP packet 430 may be generated by SDN manager 170, in which case control information 420 may include diagnostic DHCP packet 430 and an instruction to inject it at logical port=LP1 151. Diagnostic DHCP packet 430 may be a DHCP request packet that is generated based on DHCP. Header 432 includes source information (IP address=IP-1, MAC address=MAC-1) associated with VM1 131, and destination information (IP-D, MAC-D) associated with DHCP server 135.

Header 432 further includes a flag (see "DIAG_FLAG" 434) to distinguish diagnostic DHCP packet 430 from a regular DHCP request, and to instruct network elements along its datapath to send reports or observations to SDN manager 170. Payload 436 specifies IP address=IP-1 that might be in conflict with another system. Header 432 also specifies any suitable layer-4 information such as (destination port number=67, source port number=68, protocol=UDP) associated with DHCP. In practice, host-A 110A may generate diagnostic DHCP packet 430 (instead of SDN manager 170) and inject it at LP1 151 based on control information 420.

At 330-345 in FIG. 3, in response to detecting DHCP packet 430 with DIAG_FLAG=1, a network element along a datapath between LP1 151 to DHCP server 135 to generate and send report(s) to SDN controller 170. In particular, if DHCP server 135 is reachable, report=(ID, STATUS=FORWARDED) will be sent (see 335 and 340). Otherwise (unreachable), report=(ID, STATUS=DROPPED) will be sent (see 345).

Further, at 350-365 in FIG. 3, in response to detecting DHCP packet 430 with DIAG_FLAG=1, DHCP server 135 generates and sends report(s) to SDN manager 170. If no IP address conflict is detected, report=(ID, DELIVERED) will be sent (see 355 and 360), but otherwise, error message or report=(ID, STATUS=ERROR_IP_CONFLICT) will be sent (see 365). In practice, "ID" in each report represents any suitable information identifying its sender, such as a unique ID, name, type (e.g., physical entity, logical router, logical switch, distributed firewall), logical overlay network ID (e.g., VNI), etc. Each report may also include a timestamp.

In the example in FIG. 4, VM1 131, VM2 132 and DHCP server 135 are connected to a first logical switch labelled "LS1" 401 via respective logical ports LP1 151, LP2 152 and LP5 135. In this case, diagnostic DHCP packet 430 traverses a datapath that includes the following network elements: LP1 151, DFW1 161, LS1 401, DFW5 165, LP5 155 and DHCP server 135. As discussed using FIG. 1, DFW1 161, DFW2 162 and DFW3 163 are distributed firewall engines that are configured to filter packets to and from respective VM1 131, VM2 132 and DHCP server 135 according to any suitable firewall rules.

At 370-396 in FIG. 3, in response to receiving first report information (see 442 in FIG. 4) from various network elements as DHCP packet 430 traverses the datapath to DHCP server 135, SDN manager 170 performs a DHCP diagnosis. For example (see bottom of FIG. 4), first report information 442 includes: (ID=LP1, FORWARDED) from LP1 151; (DFW1, FORWARDED) from DFW1 161; (LS1, FORWARDED) from LS1 401; (DFW5, FORWARDED) from DFW5 165; and (LP5, FORWARDED) from LP5 155.

However, in response to detecting an IP address conflict (see also 440 in FIG. 4), DHCP server 135 sends an error message to SDN manager 170. For example, the error message may be in the form of (DHCP, ERROR_IP_CONFLICT IP-1 VM7) to indicate that "IP-1" specified in payload 436 has been already assigned to another system (e.g., VM7). As such, based on first report information 442, SDN manager 170 performs a DHCP diagnosis to determine that there is an IP address conflict affecting VM1 131. A diagnosis result (see 480 in FIG. 4) that includes first report information 442 is then sent to user device 409. To resolve this issue, VM1 131 may send another DHCP request to acquire a different IP address from DHCP server 135.

(b) DHCP Relay Service

Examples of the present disclosure may be used in SDN environments where DHCP relay services are deployed. In the example in FIG. 4, DHCP relay service 406 may be created (e.g., using a profile) and attached to a logical router port (see "LRP2" 408) of a logical DR (see "DR" 405). This way, DHCP relay service 406 may relay DHCP packets originating from another network (e.g., VM3 133 and VM4 134) to DHCP server 135. DR 405 is connected to a logical switch (see "LS2" 402), which in turns connects VM3 133 and VM4 to DHCP relay service 406 and DHCP server 135. See also logical ports LP7 403 and LP8 404, and logical router ports labelled "LRP1" 407 and "LRP2" 408. Using DHCP relay service 406, the number of DHCP servers may be reduced because it is not necessary to deploy a DHCP server on every network.

The example in FIG. 3 may be implemented when VM3 133 has problems with acquiring an IP address. In response to receiving a corresponding user's diagnosis request, SDN manager 170 may generate and send control information (see 450 in FIG. 4) to host-B 110A to instruct host-B 110B to inject, at logical port=LP3 153, a diagnostic DHCP packet (see "DHCP2" 460 in FIG. 4). Diagnostic DHCP packet 460 may be a broadcast packet with header 462 and payload 466. Header 462 includes (source IP=0.0.0.0, MAC=MAC-1) and (broadcast destination IP=255.255.255.255, MAC=FF:FF:FF:FF:FF:FF). Header 462 further includes a flag (see "DIAG_FLAG" 464) to instruct network elements along its datapath to send reports or observations to SDN manager 170. Any suitable layer-4 information (e.g., destination port number=67, source port number=68, protocol=UDP) associated with DHCP may be included.

To successfully reach DHCP server 135, diagnostic DHCP packet 460 has to traverse a datapath that includes the following network elements: LP3 153, DFW3 163, LS2 402, LRP2 404, DHCP relay service 406, DR 405, LRP1 407, LP7 403, DFW5 165, LP5 155 and finally DHCP server 135. However, based on second report information 472, SDN manager 170 may learn that diagnostic DHCP packet 460 is forwarded from LP3 153 to LRP2 408, but is eventually dropped at LRP2 408 according to (LPR2, DROPPED). See corresponding 470. SDN manager 170 may then report diagnostic result 480 that includes second report information 472 to user device 409. Since diagnostic DHCP packet 460 is broadcasted, it should be understood that it may be sent to other destinations where it is also dropped (not shown in FIG. 4 for simplicity).

(c) Diagnostic DHCP Packets from DHCP Server

Figure 5:
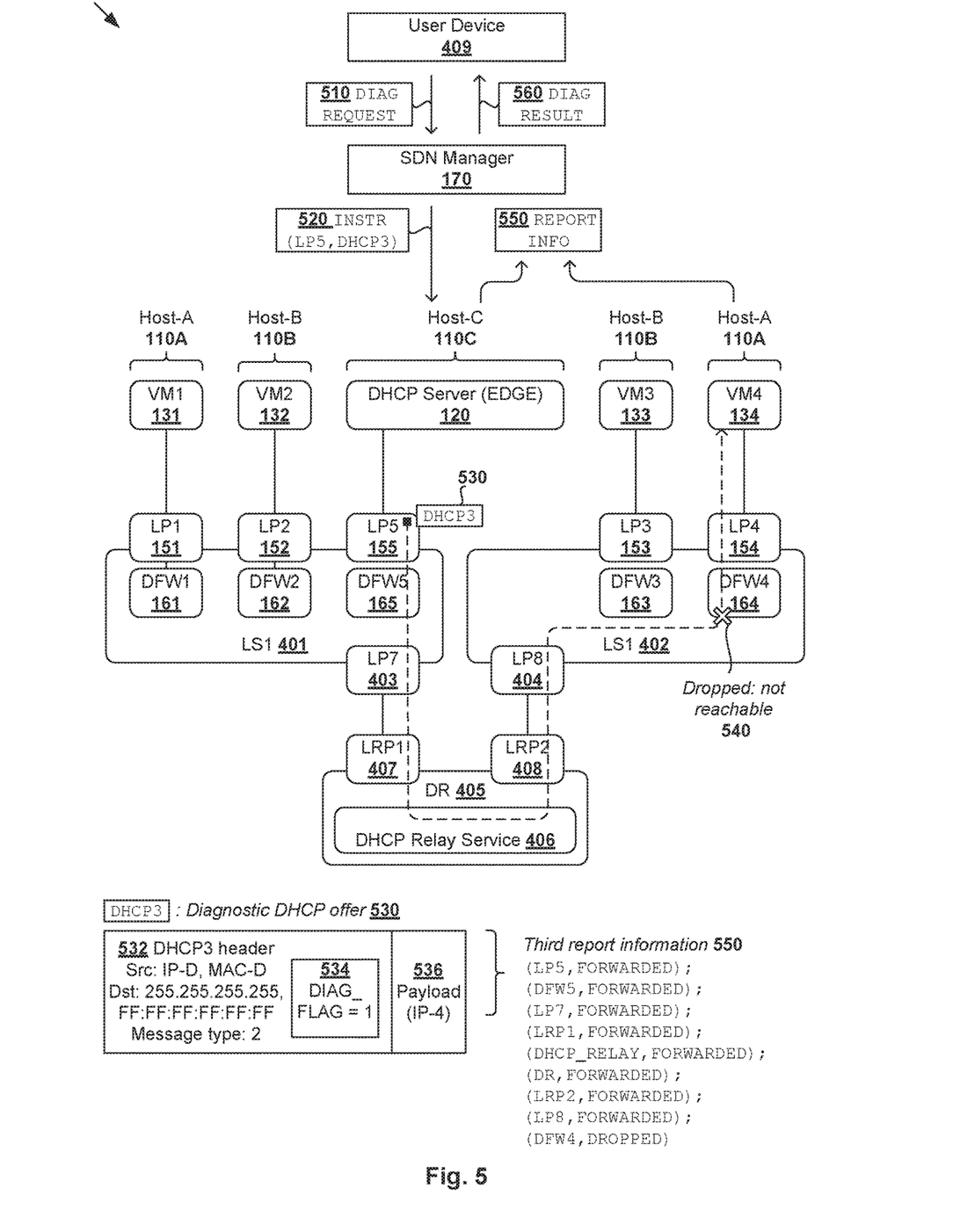
FIG. 5 is a schematic diagram illustrating an example network configuration failure diagnosis for reverse traffic from a configuration server in an SDN environment.

FIG. 5 is a schematic diagram illustrating example diagnosis 500 of network configuration failures associated with reverse traffic from a configuration server in SDN environment 100. In response to receiving a user's diagnosis request (see 510), SDN manager 170 may generate and send control information (see 520) to host-C 110C supporting DHCP server 135. This is to instruct host-C 110C to inject, at logical port=LP5 155, a diagnostic DHCP packet (see "DHCP3" 530).

Diagnostic DHCP packet 530 may be a broadcast packet (e.g., DHCP offer or acknowledgement packet) with header 532 and payload 536. Header 532 includes (source IP=IP-D, MAC=MAC-D) associated with DHCP server 135 and (broadcast destination IP=255.255.255.255, MAC=FF:FF:FF:FF:FF:FF). Header 532 further includes a flag (see "DIAG_FLAG" 534) to instruct network elements along its datapath to send reports to SDN manager 170.

To successfully reach VM4 134, for example, diagnostic DHCP packet 530 has to traverse a datapath that includes the following network elements: LP5 155, DFW5 165, LS1 401, LRP1 403, DHCP relay service 406, DR 405, LRP2 408, LP8 404, DFW4 164 and LP4 154. However, based on third report information 550 from various network elements, SDN manager 170 may learn that diagnostic DHCP packet 530 travels from LP5 155 to DFW4 164, but is dropped by DFW4 164 according to (DFW4, DROPPED). See corresponding 540. SDN manager 170 may then report diagnostic result 560 that includes third report information 550 to user device 409. In this case, the relevant firewall rule at DFW4 164 may be adjusted to resolve the issue.

Using the examples in FIG. 4 and FIG. 5, network diagnosis relating to DHCP failures may be improved. Diagnostic DHCP packet 430/460/530 may be configured with any suitable parameter(s) and type(s) specified in diagnosis request 410/510, thereby providing flexibility. For example, diagnostic DHCP packet 430/460 that is destined for DHCP server 135 in FIG. 4 may be a DHCP discover (message type=1), DHCP request message (type=3), etc. Diagnostic DHCP packet 530 that originates from DHCP server 135 in FIG. 5 may be a DHCP offer message (type=2), DHCP acknowledgement (type=5) or negative acknowledgement (type=6) message, etc.

(B) Query Failure Diagnosis

According to a second aspect of the present disclosure, query failure diagnosis may be improved in SDN environment 100 using diagnostic packets that are specifically configured according to a query protocol supported by a query server. Using examples of the present disclosure, query failures may be diagnosed more quickly to reduce the performance impact on VMs 131-134 and hosts 110A-C. Referring to FIG. 1 again, an example query protocol is a name resolution protocol, such as domain name service (DNS) protocol supported by DNS server 136. In practice, DNS server 136 may be deployed to resolve or translate a domain name (e.g., www.xyz.com) into an IP address (e.g., 139.130.4.4), and to retrieve other information associated with the domain name.

The DNS protocol is based on queries and responses (also referred to as requests and replies). The queries originate from a DNS client (e.g., VM2 132) to DNS server 136, requesting information regarding a specific domain name (e.g., www.xyz.com). Each query asks for either the IP address of the domain name, or information that could be used in order to find the requested information. DNS server 136 then returns a response to the DNS client, containing a Resource Record (RR) associated with a domain name. Any alternative and/or additional query protocol may be used, such as Address Resolution Protocol (ARP), File Transfer Protocol (FTP), HyperText Transfer Protocol (HTTP), etc.

Figure 6:
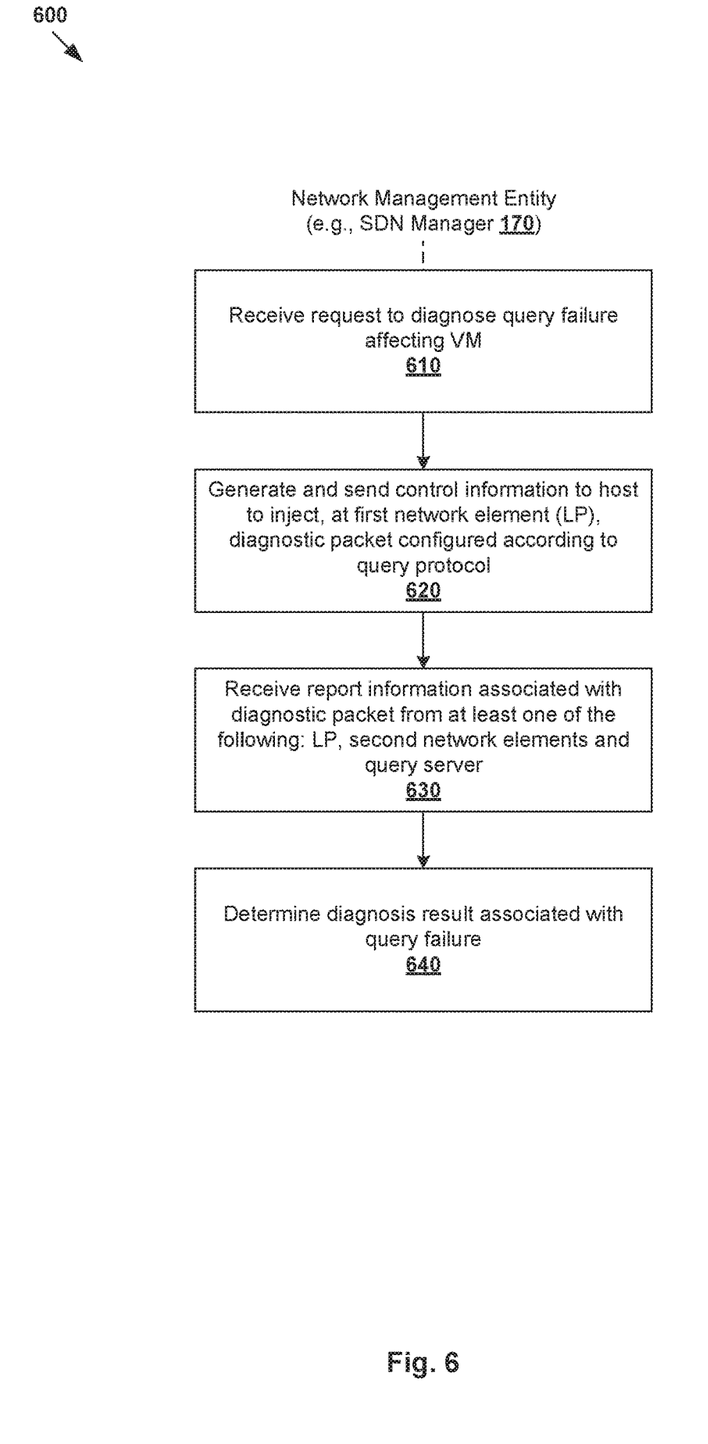
FIG. 6 is a flowchart of an example process for a network management entity to perform query failure diagnosis in an SDN environment.

In more detail, FIG. 6 is a flowchart of example process 600 for a network management entity to perform query failure diagnosis in SDN environment 100. Example process 600 may include one or more operations, functions, or actions illustrated by one or more blocks, such as 610 to 640. The various blocks may be combined into fewer blocks, divided into additional blocks, and/or eliminated depending on the desired implementation. In practice, example process 600 may be implemented by any suitable network management entity, such as SDN manager 170 using network diagnosis module 172, SDN controller 174 using CCP module 176, etc. In the following, various examples will be discussed using VM 131/132/133/134 as an example "virtualized computing instance," host 110A/110B as an example "host," and DNS server 136 as an example "query server" or "name resolution server."

At 610 in FIG. 6, SDN manager 170 receives a request to diagnose a query failure (e.g., name resolution failure) affecting VM2 132 that is connected with a first network element (e.g., LP2 152) and supported by host-B 110B. At 620 in FIG. 6, SDN manager 170 generates and sends control information (see 190 in FIG. 1) to host-B 110B to cause host-B 110B to inject, at LP2 152, a diagnostic packet (see 191 in FIG. 1) for transmission along a datapath to DNS server 136 via multiple second network elements (see examples in FIG. 8 and FIG. 9).

In the example in FIG. 1, diagnostic packet 191 may be a query that is configured according to query protocol=DNS supported by DNS server 136, such as a DNS query packet to request for information associated with a domain name, etc. Diagnostic packet 191 may be configured to include a flag to cause LP2 152, the second network elements and DNS server 136 to generate and send report information associated with diagnostic packet 191 to SDN manager 170. Again, the term "network element" may refer generally to a logical entity or physical entity, such as a logical port, logical switch, logical router port, logical router, distributed firewall engine, VNIC, physical NIC, etc.

At 630 in FIG. 6, SDN manager 170 receives report information (see 192-193 in FIG. 1) associated with diagnostic packet 191 from at least one of the following: LP2 152, any second network element, DNS server 136, or any combination thereof. At 640 in FIG. 6, based on report information 192-193, SDN manager 170 determines a diagnosis result associated with the query failure.

Any suitable query failure may be diagnosed. In one example, based on report information 192-193 indicating that diagnostic packet 191 is dropped at a particular second network element, SDN manager 170 may determine that the query failure is caused by unreachability of DNS server 136 from LP2 152. In another example, based on report information 192-193 indicating that diagnostic packet 191 is delivered to DNS server 136 but an error (e.g., invalid domain name) is detected by DNS server 136, determining that the query failure is caused by the error. By finding possible root causes using diagnostic packets, query failures may be resolved more quickly, either manually by the users or programmatically.

Example Diagnostic DNS Packets

Figure 7:
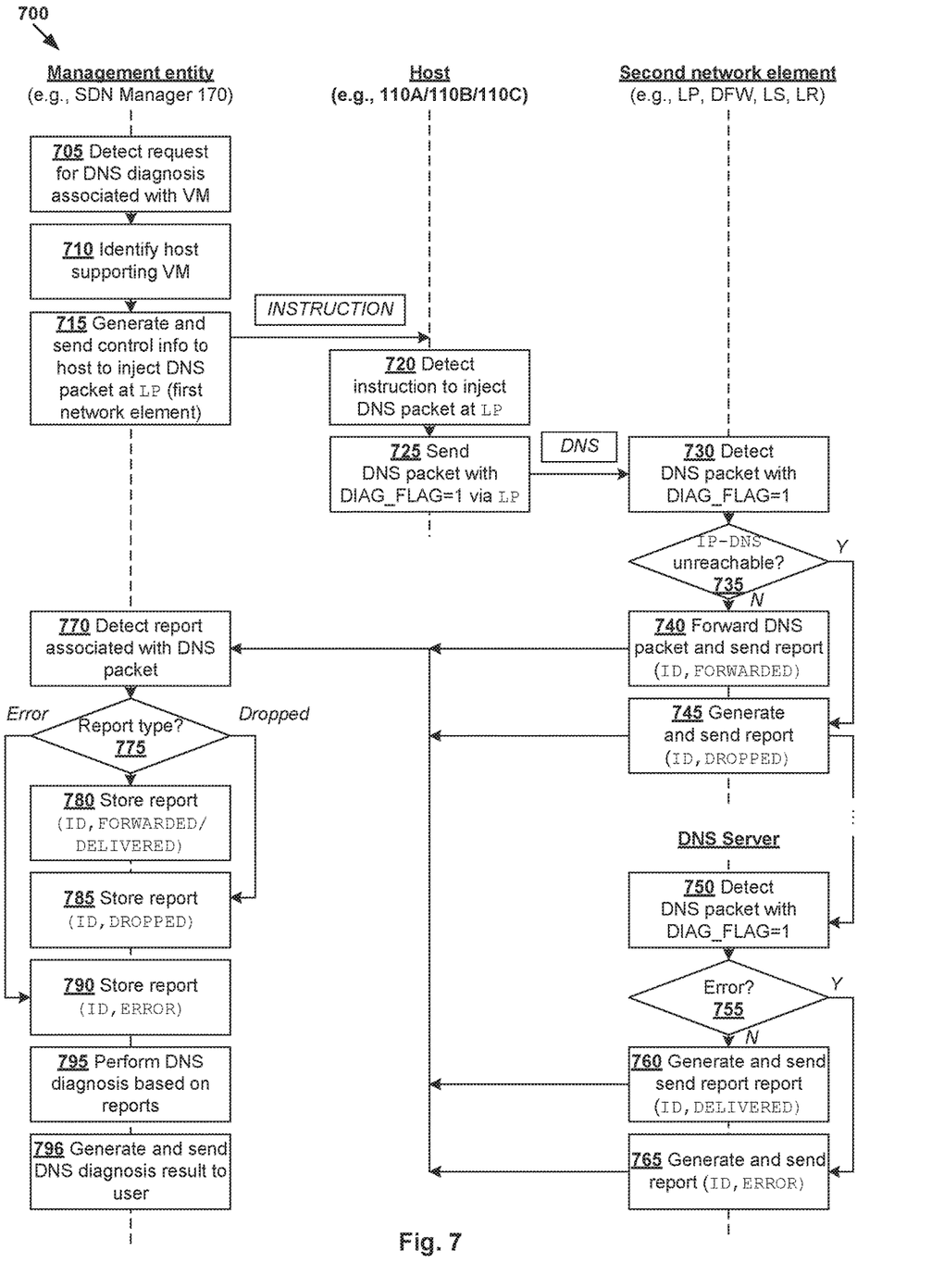
FIG. 7 is a flowchart of an example detailed process of query failure diagnosis in an SDN environment.

FIG. 7 is a flowchart of example detailed process 700 for query failure diagnosis in SDN environment 100. Example process 700 may include one or more operations, functions, or actions illustrated at 705 to 796. The various operations, functions or actions may be combined into fewer blocks, divided into additional blocks, and/or eliminated depending on the desired implementation. Example process 700 may be implemented by any suitable management entity (e.g., SDN manager 170 and/or SDN controller 174) and host 110A/

110B/110C (e.g., intermediate network elements implemented by hypervisor 114A/114B/114C), etc.

(a) Multi-Tier Topology

The example in FIG. 7 will be explained using FIG. 8, which is a schematic diagram illustrating example query failure diagnosis 800 for traffic to a query server in SDN environment 100. In SDN environment 100 with multiple tenants requiring isolation from each other, a multi-tier topology may be used. For example, a two-tier topology includes an upper tier associated with a provider logical router (PLR) and a lower tier associated with a tenant logical router (TLR). Each tier may include both DRs and SRs, or DRs and SRs on the upper tier (known as "tier-0") but only DRs at the lower tier (known "tier-1"). As such, a logical router may be categorized as one of the following types: TLR-DR, TLR-SR, PLR-DR and PLR-SR. In the example in FIG. 1, logical DRs (e.g., TLR-DR and PLR-DR) may be implemented collectively by DR instances 117A-C at respective hosts 110A-C, and represented internally using routing tables 118A-C at respective DR instances 117A-C.

The multi-tiered topology enables both the provider (e.g., data center owner) and tenant (e.g., data center tenant, often there are multiple tenants) to control their services and policies. Each tenant has full control over its TLR policies, whereas common PLR policies may be applied to different tenants. Referring to upper tier 810 in FIG. 8, two SRs (i.e., PLR-SR1 821 and PLR-SR2 822) are deployed and connected to one DR (i.e., PLR-DR 823) via transit logical switch LS1 801. Upper tier 810 connects lower tier 820 (via LS2 802) to external network 806. PLR-SR1 821 is associated with role=primary and usually operates in state=ACTIVE, while PLR-SR2 822 is associated with role=secondary and state=STANDBY. During a failover, PLR-SR2 822 transitions from STANDBY to ACTIVE.

Figure 8:
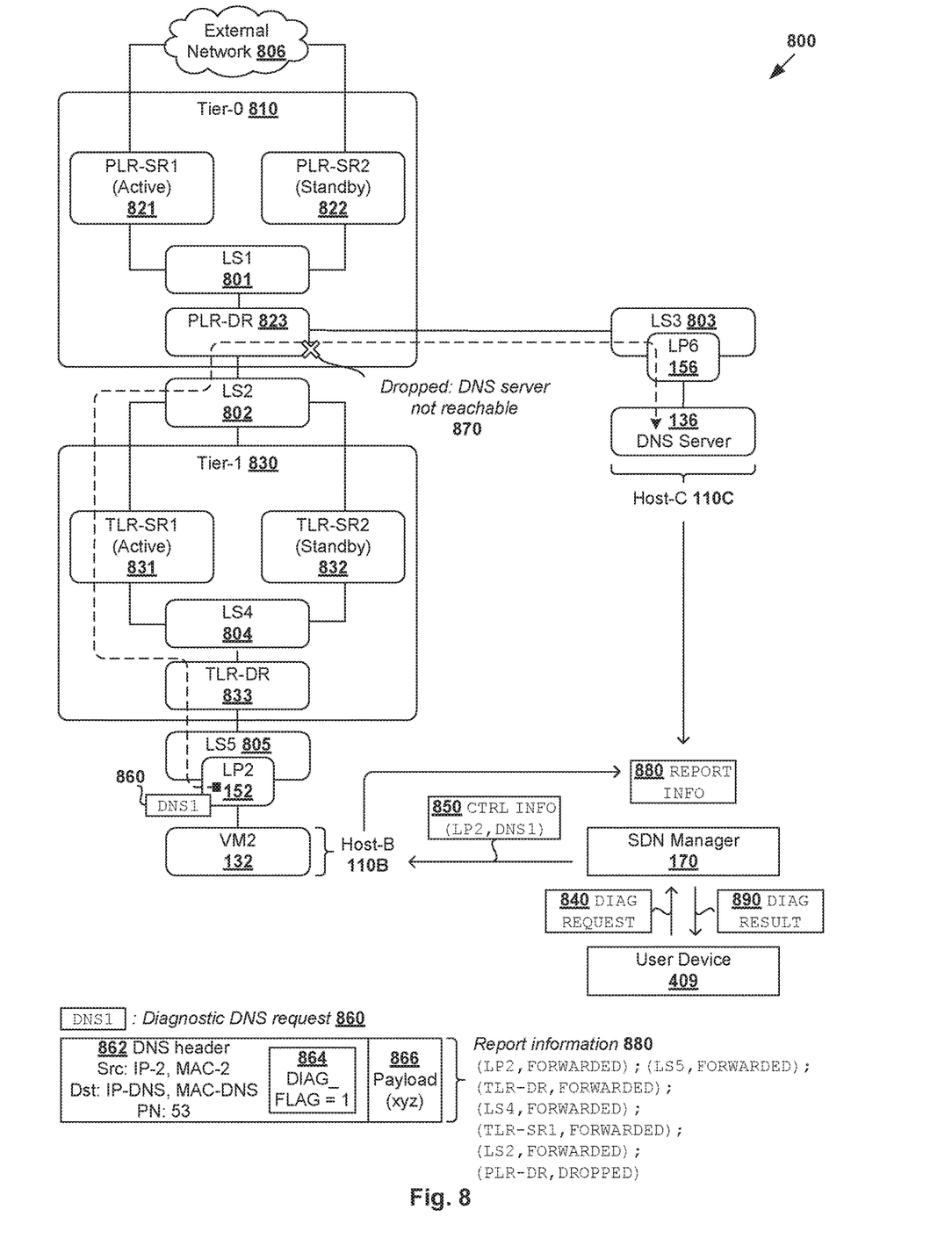
FIG. 8 is a schematic diagram illustrating an example query failure diagnosis for traffic to a query server in an SDN environment.

Referring to lower tier 830 in FIG. 8, two SRs (i.e., TLR-SR1 831 and TLR-SR2 832) are deployed and connected to one DR (i.e., TLR-DR 833) via transit logical switch LS4 804. Upper tier 830 connects lower tier 830 to external network 806. TLR-SR1 831 is associated with role=primary and usually operates in state=ACTIVE, while TLR-SR2 832 is associated with role=secondary and state=STANDBY. During a failover, TLR-SR2 832 transitions from STANDBY to ACTIVE.

DNS server 136 may be deployed to provide DNS services to VM2 132 and other VMs 131, 133-134 in FIG. 1 (not shown in FIG. 8 for simplicity). VM2 132 is connected to DNS server 136 via TLR-DR 833, TLR-SR 831/832, PLR-DR 823 and logical switches 802-805. In practice, DNS server 136 may be attached to any suitable uplink Tier-0 DR (e.g., PLR-DR 833) with a downlink logical switch port (e.g., LS3 803). In practice, a DNS forwarder (not shown for simplicity) may be deployed at a logical router at lower tier 830 to forward or relay DNS packets between VM2 132 and DNS server 136. The DNS forwarder may be deployed in lower tier 830. Also, VM2 132 may be connected to multiple DNS servers that are connected with PLR-DR 823.

(b) Diagnostic DNS Packets to DNS Server

Referring to FIG. 7, at 705, SDN manager 170 receives a user's diagnosis request (see 840 in FIG. 8) to diagnose a query failure (e.g., DNS query failure) affecting VM2 132. Again, request 840 may be received from user device 409 via any suitable interface supported by SDN manager 170, such as GUI, CLI, API calls, etc.

At 710 in FIG. 7, in response to receiving diagnosis request 840, SDN manager 170 identifies host-B 110B supporting VM2 132. Depending on the desired implementation, block 710 may involve SDN manager 170 generating and sending a query to SDN controller 174 on the CCP. In response, SDN controller 174 may send SDN manager 170 information identifying host-B 110B supporting VM2 132.

At 715 in FIG. 7, SDN manager 170 generates and sends control information (see 850 in FIG. 8) to host-B 110B to instruct host-B 110B to inject, at logical port=LP2 152 associated with VM2 132, a diagnostic DNS packet that is destined for DNS server 136. At 720 and 725, in response to receiving the control information, host-B 110B injects the diagnostic DNS packet (see "DNS1" 860 in FIG. 8) at logical port=LP2 152 for transmission to DNS server 136.

In the example in FIG. 8, diagnostic DNS packet 860 may be generated by SDN manager 170, in which case control information 850 may include diagnostic DNS packet 860 and an instruction to inject it at logical port=LP2 152. Diagnostic DNS packet 860 may be a DNS request packet that is generated based on DNS. Header 862 includes source information (IP address=IP-2, MAC address=MAC-2) associated with VM2 132, and destination information (IP-DNS, MAC-DNS) associated with DNS server 136.

Header 862 further includes a flag (see "DIAG_FLAG" 864) to distinguish diagnostic DNS packet 860 from a regular DNS packet, and to instruct network elements along its datapath to send report information to SDN manager 170. Payload 866 specifies a domain name (e.g., www.xyz.com) for which resolution to an IP address is required. Header 862 also specifies any suitable layer-4 information (UDP port number=53) associated with DNS. In practice, host-B 110B may generate diagnostic DNS packet 860 (instead of SDN manager 170) and inject it at LP2 152 based on control information 850.

At 730-745 in FIG. 7, in response to detecting DNS packet 860 with DIAG_FLAG=1, a network element along a datapath between LP2 152 to DNS server 136 may generate and send report(s) to SDN controller 170. If DNS server 136 is reachable, report=(ID, STATUS=FORWARDED) report will be sent (see 735 and 740). Otherwise, report=(ID, STATUS=DROPPED) will be sent (see 745). The report at block 745 may include an indication as to why DNS packet 860 is dropped, such as ERROR_NO_ROUTE because there is no known route to DNS server 136.

Further, at 750-765 in FIG. 7, in response to detecting DNS packet 860 with DIAG_FLAG=1, DNS server 136 generates and sends report(s) to SDN manager 170. If no error is detected, report=(ID, DELIVERED) will be sent (see 755 and 760), but otherwise, error message or report=(ID, ERROR) will be sent (see 765). For example, ERROR_DOMAIN_NAME_INVALID may be sent in response to DNS server 136 not able to resolve domain name=www.xyz.com into an IP address. In practice, "ID" in each report represents any suitable information identifying the, such as a unique ID, name, type (e.g., physical entity, logical router, logical switch, distributed firewall), logical overlay network ID (e.g., VNI), etc. Each report may also include a timestamp.

To reach DNS server 136 in FIG. 8, diagnostic DNS packet 860 traverses a datapath that includes the following network elements: LP2 152, LS5 805, TLR-DR 833, LS4 804, TLR-SR1 831 (active), LS2 802, PLR-DR 823, LS3 803 and LP6 156. Although not shown, the datapath may also include distributed firewall engines such as DFW2 162 and DFW6 166 to filter packets to and from respective VM2 132 and DNS server 136 according to any suitable firewall rules.

At 770-796 in FIG. 7, in response to receiving report information (see 880 in FIG. 8) from various network elements as DNS packet 860 traverses the datapath to DNS server 136, SDN manager 170 performs a DNS diagnosis. For example (see bottom of FIG. 8), report information 880 includes: (LP2, FORWARDED), (LS5, FORWARDED), (TLR-DR, FORWARDED), (LS4, FORWARDED), (TLR-SR1, FORWARDED), (LS2, FORWARDED) and (PLR-DR, DROPPED). Based on report information 880, SDN manager 170 may determine a diagnosis result specifying that DNS packet 860 is dropped at PLR-DR 823 before reaching DNS server 136 (see 870). Diagnosis result 890, which may include report information 880, is then sent to user device 409.

(c) Diagnostic DNS Packets from DNS Server

Figure 9:
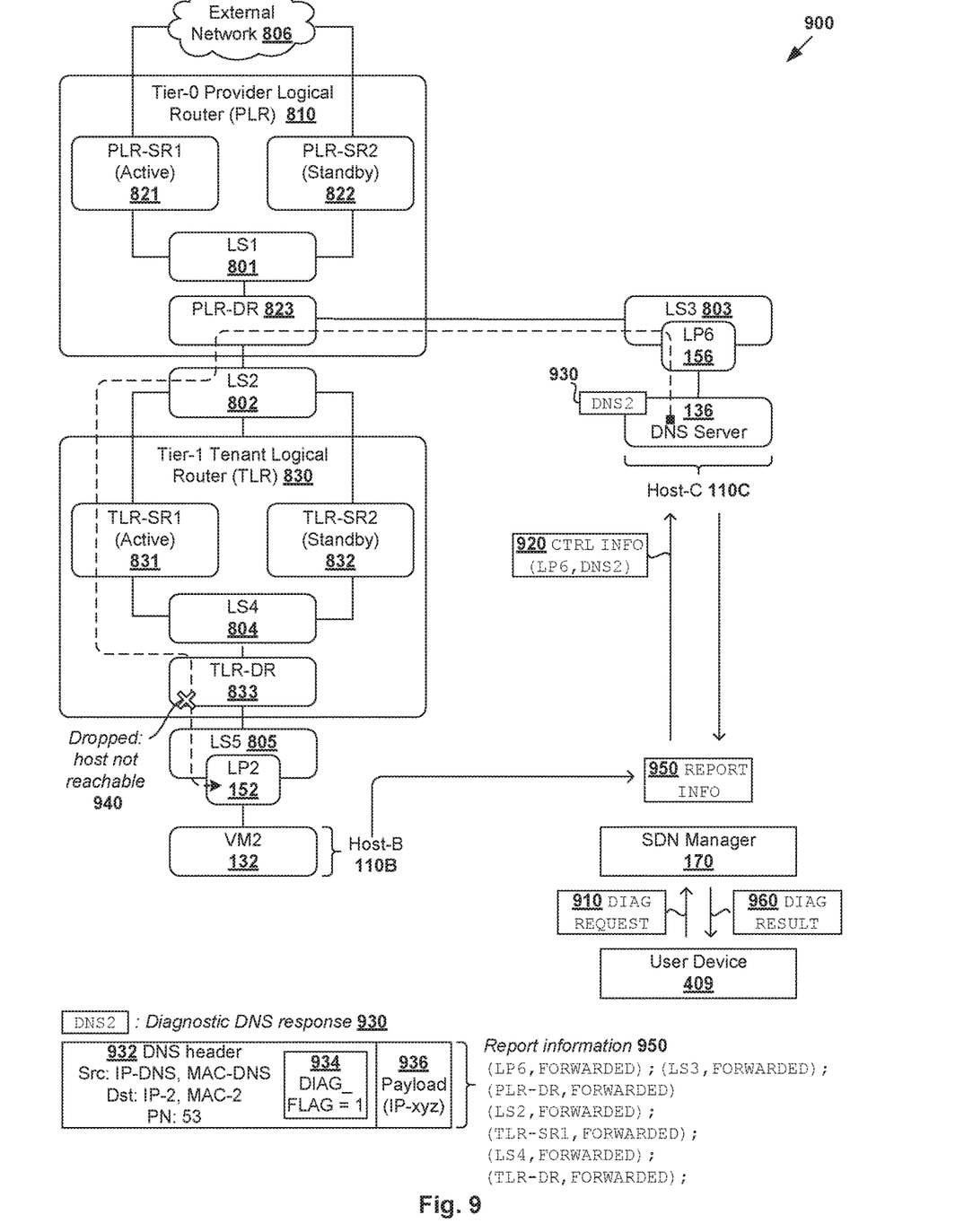
FIG. 9 is a schematic diagram illustrating an example query failure diagnosis for reverse traffic from a query server in an SDN environment.

FIG. 9 is a schematic diagram illustrating example query failure diagnosis 900 for reverse traffic from a query server in SDN environment 100. In response to receiving a user's diagnosis request (see 910), SDN manager 170 may generate and send control information (see 920) to host-C 110C supporting DNS server 136. This is to instruct host-C 110C to inject, at logical port=LP5 156, a diagnostic DNS packet (see "DNS2" 930).

Diagnostic DNS packet 930 may include header 932 and payload 936. Header 932 includes (source IP-DNS, MAC-DNS) associated with DNS server 136 and (destination IP-2, MAC-2) associated with VM2 132. Header 932 further includes a flag (see "DIAG_FLAG" 934) to instruct network elements along its datapath to send reports to SDN manager 170. Payload 936 may include information associated with a domain name, such as IP address=IP-xyz.

To successfully reach VM2 132, diagnostic DNS packet 930 has to traverse a datapath that includes the following network elements: LP6 156, LS3 803, PLR-DR 823, LS2 802, TLR-SR1 831 (active), LS4 804, TLR-DR 833, LS5 805 and LP2 152. However, based on report information 950 from various network elements, SDN manager 170 may learn that diagnostic DNS packet 930 travels from LP6 156 to TLR-DR 833, where it is dropped (see 940). SDN manager 170 may then report diagnostic result 960 that includes report information 950 to user device 409.

Using the examples in FIG. 8 and FIG. 9, network diagnosis relating to DNS-related failures may be improved. Diagnostic DNS packet 860/930 may be configured with any suitable parameter(s) and type(s) specified in diagnosis request 840/910, thereby providing flexibility. For example, diagnostic DNS packet 860 injected at LP2 152 in FIG. 8 may be a DNS query specifying: QNAME (domain name), QTYPE (query type), QCLASS (query class), etc. Diagnostic DNS packet 930 injected at LP6 156 in FIG. 9 may be a DNS response specifying: NAME (domain name), TYPE (data type), CLASS (0x0001 representing IP address), RDATA (response data), etc.

Container Implementation

Although explained using VMs 131-136, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 9, container technologies may be used to run various containers inside respective VMs 131-136. Containers are "OS-less", meaning that they do not include any OS that could weigh 10 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 9. For example, the instructions or program code, when executed by the processor of the computer system, may cause the processor to implement a "network management entity" to perform network diagnosis according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network management entity to perform query failure diagnosis in a software-defined networking (SDN) environment, wherein the method comprises:
    receiving a request to diagnose a query failure affecting a virtualized computing instance that is supported by a host and connected with a query server via a first network element;
    generating and sending control information to the host to cause the host to inject, at the first network element, a diagnostic packet for transmission along a datapath to the query server via multiple second network elements, wherein the diagnostic packet is a query configured according to a query protocol supported by the query server, and includes a flag to cause the first network element, the multiple second network elements and the query server to generate and send report information associated with the diagnostic packet to the network management entity;
    receiving report information associated with the diagnostic packet from at least one of the following: the first network element, the multiple second network elements and the query server; and
    based on the report information, determining a diagnosis result associated with the query failure.

2. The method of claim 1, wherein determining the diagnosis result comprises:
    based on report information indicating that the diagnostic packet is dropped at one of the multiple second network elements, determining that the query failure is caused by unreachability of the query server from the first network element.

3. The method of claim 1, wherein determining the diagnosis result comprises:
    based on report information indicating that the diagnostic packet is delivered to the query server but an error is detected by the query server, determining that the query failure is caused by the error.

4. The method of claim 1, wherein generating and sending the control information comprises:
    generating the control information to include the diagnostic packet and an instruction to cause the host to inject the diagnostic packet at the first network element.

5. The method of claim 4, wherein generating and sending the control information comprises:
    configuring the diagnostic packet to according to the query protocol in the form of Domain Name Service (DNS) protocol to diagnose a name resolution failure, wherein the diagnostic packet is a DNS query for information associated with a domain name.

6. The method of claim 1, wherein the method further comprises:
    receiving a second request to diagnose a second query failure affecting the query server;
    based on the second request, generating and sending second control information to inject, at a third network element to which the query server is connected, a second diagnostic packet for transmission to the virtualized computing instance via the multiple second network elements;
    receiving second report information associated with the second diagnostic packet from at least one of the following: the first network element, the multiple second network elements and the third network element; and
    based on the second report information, determining a second diagnosis result associated with the second query failure.

7. The method of claim 6, wherein generating and sending the second control information comprises:
    configuring the second diagnostic packet to according to the network configuration protocol in the form of DNS, wherein the diagnostic packet is a DNS response packet.

8. A non-transitory computer-readable storage medium that includes a set of instructions which, in response to execution by a processor of a computer system, cause the processor to perform query failure diagnosis in a software-defined networking (SDN) environment, wherein the method comprises
    receiving a request to diagnose a query failure affecting a virtualized computing instance that is supported by a host and connected with a query server via a first network element;
    generating and sending control information to the host to cause the host to inject, at the first network element, a diagnostic packet for transmission along a datapath to the query server via multiple second network elements, wherein the diagnostic packet is a query configured according to a query protocol supported by the query server, and includes a flag to cause the first network element, the multiple second network elements and the query server to generate and send report information associated with the diagnostic packet to the computer system;
    receiving report information associated with the diagnostic packet from at least one of the following: the first network element, the multiple second network elements and the query server; and
    based on the report information, determining a diagnosis result associated with the query failure.

9. The non-transitory computer-readable storage medium of claim 8, wherein determining the diagnosis result comprises:
    based on report information indicating that the diagnostic packet is dropped at one of the multiple second network elements, determining that the query failure is caused by unreachability of the query server from the first network element.

10. The non-transitory computer-readable storage medium of claim 8, wherein determining the diagnosis result comprises:
    based on report information indicating that the diagnostic packet is delivered to the query server but an error is detected by the query server, determining that the query failure is caused by the error.

11. The non-transitory computer-readable storage medium of claim 8, wherein generating and sending the control information comprises:
    generating the control information to include the diagnostic packet and an instruction to cause the host to inject the diagnostic packet at the first network element.

12. The non-transitory computer-readable storage medium of claim 11, wherein generating and sending the control information comprises:
configuring the diagnostic packet to according to the query protocol in the form of Domain Name Service (DNS) protocol to diagnose a name resolution failure, wherein the diagnostic packet is a DNS query for information associated with a domain name.

13. The non-transitory computer-readable storage medium of claim 8, wherein the method further comprises:
receiving a second request to diagnose a second query failure affecting the query server;
based on the second request, generating and sending second control information to inject, at a third network element to which the query server is connected, a second diagnostic packet for transmission to the virtualized computing instance via the multiple second network elements;
receiving second report information associated with the second diagnostic packet from at least one of the following: the first network element, the multiple second network elements and the third network element; and
based on the second report information, determining a second diagnosis result associated with the second query failure.

14. The non-transitory computer-readable storage medium of claim 13, wherein generating and sending the second control information comprises:
configuring the second diagnostic packet to according to the network configuration protocol in the form of DNS, wherein the diagnostic packet is a DNS response packet.

15. A computer system configured to perform query failure diagnosis in a software-defined networking (SDN) environment, wherein the computer system comprises:
a processor; and
a non-transitory computer-readable medium having stored thereon instructions that, when executed by the processor, cause the processor to perform the following:
receive a request to diagnose a query failure affecting a virtualized computing instance that is supported by a host and connected with a query server via a first network element;
generate and send control information to the host to cause the host to inject, at the first network element, a diagnostic packet for transmission along a datapath to the query server via multiple second network elements,
wherein the diagnostic packet is a query configured according to a query protocol supported by the query server, and includes a flag to cause the first network element, the multiple second network elements and the query server to generate and send report information associated with the diagnostic packet to the computer system;
receive report information associated with the diagnostic packet from at least one of the following: the first network element, the multiple second network elements and the query server; and
based on the report information, determining a diagnosis result associated with the query failure.

16. The computer system of claim 15, wherein the instructions for determining the diagnosis result cause the processor to:
based on report information indicating that the diagnostic packet is dropped at one of the multiple second network elements, determining that the query failure is caused by unreachability of the query server from the first network element.

17. The computer system of claim 15, wherein the instructions for determining the diagnosis result cause the processor to:
based on report information indicating that the diagnostic packet is delivered to the query server but an error is detected by the query server, determining that the query failure is caused by the error.

18. The computer system of claim 15, wherein the instructions for generating and sending the control information cause the processor to:
generating the control information to include the diagnostic packet and an instruction to cause the host to inject the diagnostic packet at the first network element.

19. The computer system of claim 18, wherein the instructions for generating and sending the control information cause the processor to:
configure the diagnostic packet to according to the query protocol in the form of Domain Name Service (DNS) protocol to diagnose a name resolution failure, wherein the diagnostic packet is a DNS query for information associated with a domain name.

20. The computer system of claim 15, wherein the instructions further cause the processor to:
receive a second request to diagnose a second query failure affecting the query server;
based on the second request, generate and send second control information to inject, at a third network element to which the query server is connected, a second diagnostic packet for transmission to the virtualized computing instance via the multiple second network elements;
receive second report information associated with the second diagnostic packet from at least one of the following: the first network element, the multiple second network elements and the third network element; and
based on the second report information, determining a second diagnosis result associated with the second query failure.

21. The computer system of claim 20, wherein the instructions for generating and sending the second control information cause the processor to:
configure the second diagnostic packet to according to the network configuration protocol in the form of DNS, wherein the diagnostic packet is a DNS response packet.

* * * * *